(No Model.)

J. J. PRATT.
SAFETY CAR.

No. 373,480. Patented Nov. 22, 1887.

WITNESSES.
Albert D. Grover
Charles D. Crocker.

INVENTOR.
John J. Pratt,
by Wight, Brown & Crossley
attys.

UNITED STATES PATENT OFFICE.

JOHN J. PRATT, OF WAKEFIELD, ASSIGNOR OF ONE-HALF TO CHARLES H. LEWIS, OF BOSTON, MASSACHUSETTS.

SAFETY-CAR.

SPECIFICATION forming part of Letters Patent No. 373,480, dated November 22, 1887.

Application filed March 14, 1887. Serial No. 230,830. (No model.)

*To all whom it may concern:*

Be it known that I, JOHN J. PRATT, of Wakefield, in the county of Middlesex and State of Massachusetts, have invented certain new and useful Improvements in Railway-Cars, of which the following is a specification.

My invention relates to railway-cars, and has for its object to provide the roof of cars as commonly constructed with improved means of exit for persons in the car or ingress for persons outside desiring to gain access to the car in case of accident, as when the car is overturned or "telescoped" with an adjacent car and the doors or windows cannot be opened, so as to permit of escape therethrough.

It not infrequently happens in case of railway accidents that the cars or coaches are so jammed against or telescoped with each other or twisted or jammed against other things as to prevent the opening of the doors or windows, or so as not to allow of exit from the car or coach if these devices can be opened. It also generally happens that derailed cars are so positioned that the roof is the only point through which it is practicable to make an opening for the escape of imprisoned passengers, and while it has been proposed to provide "man-openings" in the roof for this purpose the construction of these contrivances has been such as to render them objectionable, for the same reasons that have been mentioned as arising with respect to doors and windows—viz., that they cannot be readily opened.

My invention overcomes the objections mentioned, consisting, as it does, in constructing the roof of the car, or, preferably, the roof of the "monitor" portion of the car, in sections, which sections are hinged substantially at the edge of the roof, and are constructed to be folded back from a central line along the roof, at which central line they are bolted or fastened with devices that may readily be operated from both the interior and exterior of the car.

My invention also consists in other improvements incidental to the foregoing, all as hereinafter fully described and claimed.

Reference is to be had to the accompanying drawings, and to the letters of reference marked thereon, forming a part of this specification, the same letters indicating the same parts in both views.

Figure 1:
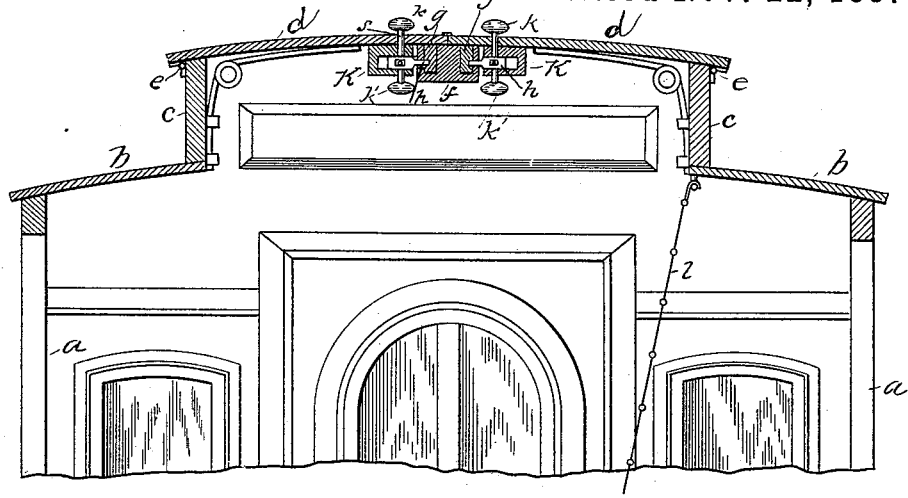
Figure 2:
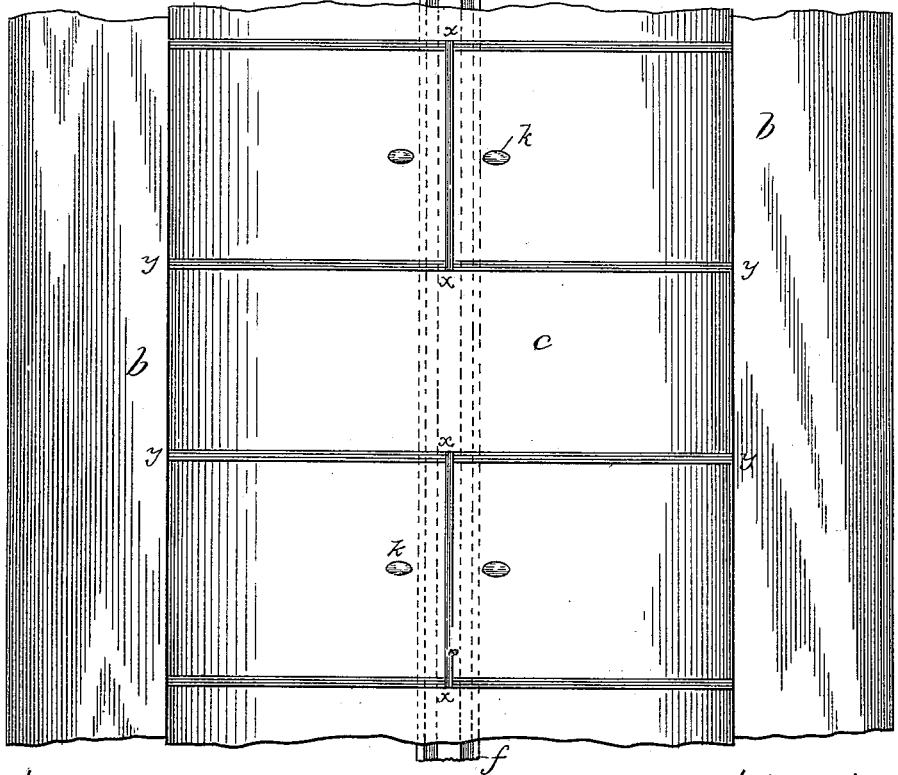

Of the drawings, Figure 1 represents a vertical section through the top of a car having my improvements applied thereto. Fig. 2 is a top plan view of a portion of the roof of a car as represented in Fig. 1.

$a\ a$ represent the sides of the car or coach; $b\ b$, the roof of the same; $c\ c$, the sides of the monitor; and $d\ d$, the roof of the latter, which I construct in sections divided longitudinally at intervals along the center, as along the line $x\ x$, and also transversely at suitable intervals, as along the lines $y\ y$. The sections thus constructed are hinged at their outer edges, as indicated by the letter $e$, to the sides $c$ of the monitor and at their inner edges or ends rest on a beam, $f$, extending longitudinally along the top of the car.

Beam $f$ is provided in its upper face with two grooves, into which slats or flanged projections $g$ of the hinged sections extend, as clearly portrayed in Fig. 1.

The several sections are provided with "weather-strips" of suitable construction at their junctions along the lines $x\ x$ and $y\ y$ to render their joints water-tight at these points. Ordinarily, the weight of these hinged sections will be sufficient to maintain them in proper position without impairing their efficiency as a roof for the car; but in order to lock them securely in position and insure their retention in place against ordinary jars and concussions I provide a spring knob-latch, $k$, Fig. 3, of the form in common use on doors of dwelling-houses, the bolt $h$ of which device extends through a hole formed in the side of the beam $f$ into a socket or hole formed in the slat $g$ therein. One of the knobs, $k$, of the operating-shaft $s$ of the latch extends above the roof of the car and the other, $k'$, below, as shown, so that the latch can be operated from the interior or outside of the car, as may be desired; and in order to facilitate the throwing or folding back of the sections (in instances where a latch is provided) when released by withdrawing bolt $h$, I provide a spring, $i$, secured at one end to the side $c$ of the monitor and bearing at its other free end upward against one of the hinged sections, so that the moment one of said hinged sections is released or unlatched at its inner or forward end spring $i$ will operate to throw it back or upward, and in case the car is overturned or thrown upon its side the jar or concussion will in all likelihood be sufficient to operate the latch, so as to release the inner ends of the hinged sections, and the series, on one side at least, will be opened by the action of spring $i$; and to facilitate and render certain this automatic operation of the latch when the car is overturned, I may provide the operating-shaft $s$ or bolt $h$ with a weight, which will act to throw back the bolt $h$ only when the car is overturned or thrown upon its side.

It is obvious that changes may be made in the form and arrangement of the devices for latching or holding the hinged sections of the roof in place without departing from the nature or spirit of the invention, the essential feature of which is the construction of substantially the entire roof of the monitor of a car or coach in sections hinged at their rear or outer edges or ends and opening upward and outward both ways from the center of the roof, so that in case of accident means of escape may be had, without the use of saw, ax, or other implement, through the roof at any point along the car.

My improvements are of particular importance in case of accidents where a car or coach is thrown or runs off a bridge and the top or roof alone of the car projects above the water, and escape could not possibly be effected at any other point than through the roof; and to facilitate the matter of reaching the roof, I provide a rope ladder, $l$, which may be attached by one end to the roof of the car and adapted to be folded up thereagainst when not wanted for use and let down when required, as represented in Fig. 1.

Having thus described my invention, what I claim is—

1. A railway car or coach having its roof constructed in sections hinged at their rear or outer edges or ends, as at $e\ e$, and opening upward and outward both ways from the longitudinal center $x\ x$ of the roof, substantially as described.

2. A railway car or coach having its roof constructed in sections hinged at their rear or outer edges or ends, as at $e\ e$, and opening upward and outward both ways from the longitudinal center $x\ x$ of the roof, in combination with devices, substantially as described, for latching or locking the sections in closed position, as set forth.

3. A railway car or coach having its roof constructed in sections hinged at their rear or outer edges or ends, as at $e\ e$, and opening upward and outward both ways from the longitudinal center $x\ x$ of the roof, in combination with devices, substantially as described, for latching or locking the sections in closed position, and springs secured at one end to the car-body and bearing at the other against said hinged sections to throw them open when unlatched or released at their inner ends, as set forth.

In testimony whereof I have signed my name to this specification, in the presence of two subscribing witnesses, this 8th day of March, A. D. 1887.

JOHN J. PRATT.

Witnesses:
ARTHUR W. CROSSLEY,
C. F. BROWN.